(12) United States Patent
Eliaz (10) Patent No.: US 8,599,914 B1
(45) Date of Patent: Dec. 3, 2013

(54) FEED FORWARD EQUALIZATION FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,018

(22) Filed: Jan. 31, 2013

Related U.S. Application Data (60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H03H 7/30* (2006.01)
(52) U.S. Cl.
USPC ........... 375/232; 375/229; 375/233; 375/234; 379/394; 379/398
(58) Field of Classification Search
None
See application file for complete search history.

(56) References Cited

U.S. PATENT DOCUMENTS

| | | | |
|---|---|---|---|
| 6,272,173 B1 * | 8/2001 | Hatamian ..................... | 375/229 |
| 2007/0258517 A1 * | 11/2007 | Rollings et al. ............... | 375/233 |
| 2008/0080644 A1 * | 4/2008 | Batruni .......................... | 375/324 |
| 2011/0074500 A1 * | 3/2011 | Bouillet et al. ............... | 329/347 |

OTHER PUBLICATIONS

Equalization: The Correction and Analysis of Degraded Signals, White Paper, Agilent Technologies, Ransom Stephens V1.0, Aug. 15, 2005 (12 pages).
Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).
Intuitive Guide to Principles of Communications, www.complextoreal.com, Inter Symbol Interference (ISI) and Root-raised Cosine (RRC) filtering, (2002), pp. 1-23 (23 pages).
Chan, N., "Partial Response Signaling with a Maximum Likelihood Sequence Estimation Receiver" (1980). Open Access Dissertations and Theses. Paper 2855, (123 pages).
The Viterbi Algorithm, Ryan, M.S. and Nudd, G.R., Department of Computer Science, Univ. of Warwick, Coventry, (1993) (17 pages).

(Continued)

*Primary Examiner* — Adolf Dsouza
(74) *Attorney, Agent, or Firm* — McAndrews, Held & Malloy, Ltd.

(57) ABSTRACT

A receiver may be operable to receive a signal. A sequence estimation module of the receiver may generate estimated symbols corresponding to the received signal. The generating of the estimated symbols may use tap information associated with one or both of a pulse shaper via which the signal was transmitted and an input filter of the receiver. The sequence estimation module may generate a reconstructed signal based on the estimated symbols and the tap information. A feed forward equalizer (FFE) of the receiver may adapt a plurality of tap coefficients of the FFE based on the reconstructed signal. The signal may be equalized via the FFE. The adaptation of the tap coefficients of the FFE may be based on a least-mean-square (LMS) process for minimizing a mean square of the error signal. An output signal of the FFE may comprise a power gain compensation.

12 Claims, 6 Drawing Sheets

(56) References Cited

OTHER PUBLICATIONS

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

* cited by examiner

FEED FORWARD EQUALIZATION FOR HIGHLY-SPECTRALLY-EFFICIENT COMMUNICATIONS

CROSS-REFERENCE TO RELATED APPLICATIONS/INCORPORATION BY REFERENCE

This patent application makes reference to, claims priority to, and claims benefit from:
U.S. Provisional Patent Application Ser. No. 61/662,085 entitled "Apparatus and Method for Efficient Utilization of Bandwidth" and filed on Jun. 20, 2012;
U.S. Provisional Patent Application Ser. No. 61/726,099 entitled "Modulation Scheme Based on Partial Response" and filed on Nov. 14, 2012;
U.S. Provisional Patent Application Ser. No. 61/729,774 entitled "Modulation Scheme Based on Partial Response" and filed on Nov. 26, 2012; and
U.S. Provisional Patent Application Ser. No. 61/747,132 entitled "Modulation Scheme Based on Partial Response" and filed on Dec. 28, 2012.

This application also makes reference to:
U.S. patent application Ser. No. 13/754,964 filed on Jan. 31, 2013;
U.S. patent application Ser. No. 13/754,998 filed on Jan. 31, 2013;
U.S. patent application Ser. No. 13/755,011 filed on Jan. 31, 2013;
U.S. patent application Ser. No. 13/755,014 filed on Jan. 31, 2013;
U.S. patent application Ser. No. 13/755,021 filed on Jan. 31, 2013;
U.S. patent application Ser. No. 13/755,025 filed on Jan. 31, 2013; and
U.S. patent application Ser. No. 13/755,043 filed on Jan. 31, 2013.

Each of the above stated applications is hereby incorporated herein by reference in its entirety.

FIELD

Certain embodiments of the disclosure relate to communication systems. More specifically, certain embodiments of the disclosure relate to a method and system for feed forward equalization for highly-spectrally-efficient communications.

BACKGROUND

Existing communications methods and systems are overly power hungry and/or spectrally inefficient. Complex linear modulation schemes such as, for example, quadrature amplitude modulation (QAM), are used vastly in wireless and non-wireless communications. However, performance of such modulation schemes degrades in the presence of phase noise and non-linear distortion associated with the communication channel. Some of these modulation schemes may perform, for example, 4-5 dB below the Shannon capacity bound in the case of severe phase noise. As higher-order modulation is needed to drive more throughput, the result may be a throughput that is even further away from the Shannon capacity limit. That is, the gap between desired spectral efficiency and actual spectral efficiency may actually increase with increasing QAM order. In addition, higher-order modulation may also be increasingly sensitive to non-linear distortion.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for feed forward equalization for highly-spectrally-efficient communications, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Certain embodiments of the disclosure can be found in a method and system for feed forward equalization for highly-spectrally-efficient communications. In various embodiments of the disclosure, a receiver in a communication system may be operable to receive a signal in the receiver. A sequence estimation module of the receiver may be operable to generate estimated symbols corresponding to the received signal. In this regard, the generating of the estimated symbols may use tap information associated with one or both of a pulse shaper via which the signal was transmitted and an input filter of the receiver. The sequence estimation module may be operable to generate a reconstructed signal, and the reconstructed signal is generated based on the estimated symbols and the tap information. A feed forward equalizer (FFE) of the receiver may be operable to adapt a plurality of tap coefficients of the FFE based on the reconstructed signal. The signal may be equalized via the FFE. In this regard, the reconstructed signal may be generated, for example, based on convolution of the estimated symbols with the taps information associated with the pulse shaper and/or the input filter. The generation of the reconstructed signal may incorporate a non-linear model, for example. The FFE may comprise, for example, a finite impulse response (FIR) filter. A plurality of taps of the FFE may comprise a center tap, one or more early taps and one or more late taps. An initial value of a coefficient of the center tap may be set to one and an initial value of a coefficient of each of the early taps and each of the late taps may be set to zero, for example.

In an example embodiment of the disclosure, the FFE may be operable to adapt the plurality of tap coefficients of the FFE based on a least-mean-square (LMS) process for minimizing a mean square error. An output signal of the FFE may comprise a power gain compensation, for example. The FFE may be operable to utilize a determined loop gain to adjust a convergence time of the adaptation of the plurality of tap coefficients of the FFE. The loop gain may be adjusted by the FFE based on a predefined symbol counter level and/or other adaptive method. The loop gain may be adjusted, for example, by scaling a value of the loop gain by a factor of two until the value reaches a determined value. The FFE may be operable to determine to adjust the convergence time based on a noise level of an output signal of the FFE.

In an example embodiment of the disclosure, in instances when at least one of measured performance indicators is below a determined threshold, the loop gain may be set to zero to stop the adaption of the tap coefficients of the FFE. In this regard, the measured performance indicators may be based on metrics calculated by the sequence estimation module, for example.

In an example embodiment of the disclosure, the FFE may be operable to receive an error signal that may be generated in reference to the reconstructed signal generated by the sequence estimation module. The reconstructed signal may be generated based on, for example, the estimated symbols convolved with the taps information associated with the pulse shaper and/or the input filter. The FFE may be operable to adapt the plurality of tap coefficients of the FFE based on the received error signal. In this regard, the adaptation may be based on the LMS process for minimizing a mean square error, and the output signal of the FFE may comprise the power gain compensation to overcome a reduced signal power due to the LMS process.

Figure 1:
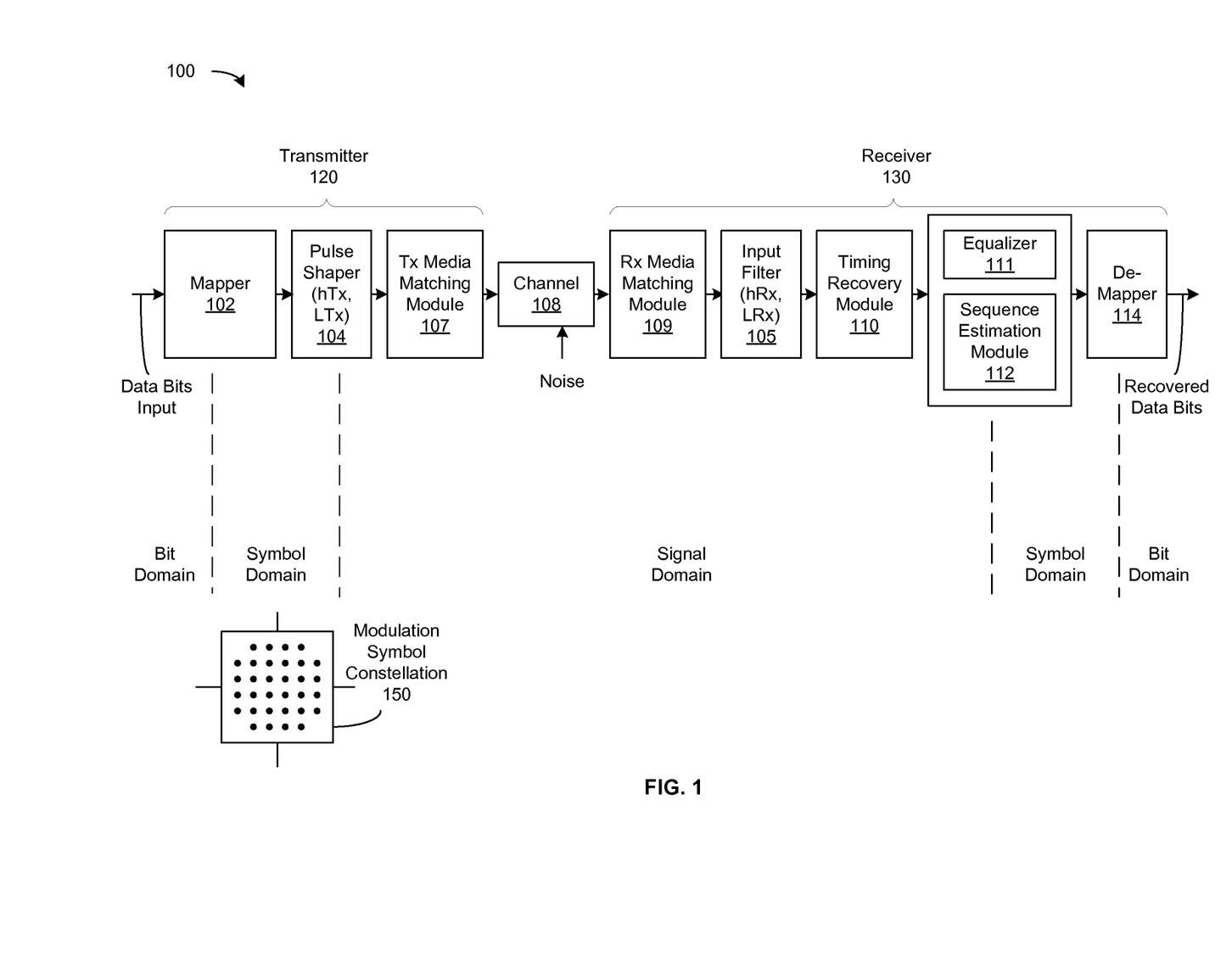
FIG. 1 is a block diagram illustrating an example communication system, in accordance with an embodiment of the disclosure.

FIG. 1 is a block diagram illustrating an example communication system, in accordance with an embodiment of the disclosure. Referring to FIG. 1, there is shown a communication system 100. The communication system 100 may comprise a transmitter 120, a communication channel 108 and a receiver 130. The transmitter 120 may comprise, for example, a mapper 102 and a Tx media matching module 107. The receiver 130 may comprise, for example, an Rx media matching module 109, a timing recovery module 110, an equalizer 111, a sequence estimation module 112 and a de-mapper 114. A total partial response filtering function of a pulse shaper 104 may be split between the transmitter 120 and the receiver 130. In this regard, the transmitter 120 may comprise a pulse shaper 104 and the receiver 130 may comprise an input filter 105. The total partial response filtering function may be split between the pulse shaper 104 and the input filter 105. In an example embodiment of the disclosure, other components such as, for example, a forward error correction (FEC) encoder in the transmitter 120, an interleaver in the transmitter 120, a de-interleaver in the receiver 130, and/or a FEC decoder in the receiver 130 may also be optionally included without departing from the spirit and scope of various embodiments of the disclosure.

The mapper 102 may comprise suitable logic, circuitry, interfaces and/or code that may be operable to input data bits and generate symbols according to, for example, a linear modulation scheme such as a quadrature amplitude modulation (QAM). In this regard, an M-QAM modulation scheme may comprise a total of M symbols in a QAM symbol constellation over an I-Q plane (M is a positive integer). For example, 32-QAM may comprise a total of 32 symbols in the 32-QAM symbol constellation. A modulation symbol constellation 150 is also illustrated in FIG. 1. Although M-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the M-QAM constellation may be regularly spaced ("on-grid") or irregularly spaced ("off-grid").

The pulse shaper 104 may comprise suitable logic, circuitry, interfaces and/or code that may be operable to adjust the waveform of a signal received from the mapper 102 such that the waveform of a resulting signal complies with the spectral requirements of a communication channel such as the channel 108. The spectral requirements may be referred to as the "spectral mask" and may be established by a regulatory body (e.g., the Federal Communications Commission in the United States or the European Telecommunications Standards Institute) and/or a standard body (e.g., Third Generation Partnership Project) that governs the communication channels and/or standards in use.

The input filter 105 may comprise suitable logic, circuitry, interfaces and/or code that may be operable to adjust the waveform of the signal received via the channel 108 to generate a signal for further processing in the receiver 130.

Each of the pulse shaper 104 and the input filter 105 may comprise, for example, an infinite impulse response (IIR) and/or a finite impulse response (FIR) filter. The number of taps in the pulse shaper 104 is designated LTx and the number of taps in the input filter 105 is designated LRx. The impulse response of the pulse shaper 104 is denoted herein as hTx and the impulse response of the input filter 105 is denoted herein as hTRx.

In an example embodiment of the disclosure, in order to improve tolerance of non-linearity, the pulse shaper 104 and the input filter 105 may be configured such that each of the output signal of the pulse shaper 104 and the output signal of the input filter 105 intentionally has a substantial amount of inter-symbol interference (ISI). In this regard, the ISI is therefore a controlled ISI. Accordingly, the pulse shaper 104 may be referred to as a partial response pulse shaping filter, and the resulting (output) signals of the pulse shaper 104 and the input filter 105 may be referred to as partial response signals or as residing in the partial response domain. The number of the taps and/or the values of the tap coefficients of the input filter 105 may be designed such that it is intentionally non-optimal in terms of noise in order to improve the tolerance of non-linearity. In this regard, the pulse shaper 104 and/or the input filter 105 in the system 100 may offer superior performance in the presence of non-linearity as compared to, for example, a conventional near zero positive ISI pulse shaping filter such as a raised cosine (RC) pulse shaping filter or a root-raised cosine (RRC) pulse shaping filter.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency (where aliasing creates correlation among symbols).

A "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the pulse shaper 104 and/or the input filter 105 are below a determined level. Reducing L may reduce decoding complexity of a sequence estimation process in the receiver 130. This tradeoff may be optimized during the design of the pulse shaper 104 and the input filter 105 in the system 100.

The Tx media matching module 107 may comprise suitable logic, circuitry, interfaces and/or code that may be operable to transform the partial response signal outputted by the pulse shaper 104 to an appropriate signal needed to drive the media in the channel 108. For example, the Tx media matching module 107 may comprise a power amplifier, a radio frequency (RF) up-converter, an optical transceiver for optical application, and/or other transformation device which may be required for propagating over the media.

The Rx media matching module 109 may comprise suitable logic, circuitry, interfaces and/or code that may be operable to convert the signal coming from the media in the channel 108 to baseband signal for processing or demodulating. For example, the Rx media matching module 109 may comprise a power amplifier, a radio frequency (RF) down-converter, an optical transceiver for optical application, and/or other transformation device.

The channel 108 may comprise suitable logic, circuitry, device, interfaces and/or code that may be operable to transmit signals from the transmitter 120 to the receiver 130. The channel 108 may comprise a wired, wireless and/or optical communication medium. The channel 108 may comprise noise such as, for example, additive white Gaussian noise (AWGN). The channel 108 may also introduce distortions such as multipath and fading. In an example embodiment of the disclosure, signals transmitted over the channel 108 may include distortion such as, for example, phase noise and/or non-linear distortion. In this regard, for example, the channel 108 may receive signals from the transmitter 120 via the Tx media matching module 107. The receiver 130 may receive signals from the channel 108 via the Rx media matching module 109. Both the Tx media matching module 107 and the Rx media matching module 109 may introduce distortion such as phase noise and non-linear distortion (and/or other non-idealities) caused by, for example, limited dynamic range of components. For example, in radio applications, frequency sources may be needed for up-converting the partial response signal outputted by the pulse shaper 104 from baseband to radio frequency (RF). The frequency sources may introduce phase noise which may distort the phase of the modulated signal. Non-linear distortion (e.g., 3rd order) may be generated by elements such as, for example, mixers, power amplifiers, variable attenuators and/or baseband analog amplifiers.

The timing recovery module 110 may comprise suitable logic, circuitry, interfaces and/or code that may be operable to perform retiming of the signal received by the receiver 130. The timing recovery module 110 may be operable to extract the symbol timing out of the filtered signal to enable the demodulating process. For example, the timing recovery module 110 may be operable to decimate sampling rate down to the baud rate or twice of the baud rate according to equalizer type (e.g., T-spaced or fractionally spaced).

The equalizer 111 may comprise suitable logic, circuitry, interfaces and/or code that may be operable to perform equalization functions for the receiver 130. The equalizer 111 may be operable to process a signal received by the equalizer 111 to reduce, for example, ISI caused by the channel 108 between the transmitter 120 and the receiver 130. In an example embodiment of the disclosure, the input signal of the equalizer 111 may be an ISC signal such as a partial response signal received via the channel 108. In this regard, the output signal of the equalizer 111 may be a partial response signal where the ISI left in the output signal may be primarily the result of the pulse shaper 104 and/or the input filter 105 (there may be some residual ISI from multipath, for example, due to use of a least-mean-square (LMS) approach in the equalizer 111). In an example embodiment of the disclosure, the equalizer 111 may be adapted based on an error signal that may be generated in reference to a reconstructed signal (e.g., a reconstructed partial response signal) generated by the sequence estimation module 112.

The sequence estimation module 112 may comprise suitable logic, circuitry, interfaces and/or code that may be operable to perform sequence estimation functions for the receiver 130. An output of the sequence estimation module 112 may be a best estimation (estimated symbol) as to the value of a corresponding transmitted symbol (and/or the corresponding transmitted information bits) generated by the mapper 102 in the transmitter 120. The estimated values may comprise soft-decision estimates, hard-decision estimates, or both. In an example embodiment of the disclosure, sequence estimation module may incorporate a non-linear model of the signal received by the receiver 130. The non-linear model may be used to compensate for non-linear distortion such that an approximation of the non-linearity generated in the transmitter 120 (e.g., by a power amplifier), in the channel 108, and/or in the module 109 (e.g., by a mixer) may be applied during the sequence estimation process in the sequence estimation module 112. The sequence estimation process may also comprise generating a reconstructed signal based on, for example, convolution of the generated symbols (estimated symbols) with taps information associated with the pulse shaper 104 and/or the input filter 105. The taps information associated with the pulse shaper 104 and/or the input filter 105 may be presented, for example, in the form of L (where LTx<=L<=(LTx+LRx−1)) tap coefficients corresponding to the total partial response h, according to the LTx tap coefficients of the pulse shaper 104 and the LRx tap coefficients of the input filter 105. The generated reconstructed signal may then be used as a reference signal to generate an error signal for the equalizer 111.

The de-mapper 114 may comprise suitable logic, circuitry, interfaces and/or code that may be operable to input symbol estimation (estimated symbols) from the sequence estimation module 112 and generate recovered data bits according to, for example, a linear modulation scheme such as a M-QAM. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1 - P_b}\right),$$

where $P_b$ is the probability that bit b=1.

In operation, the sequence estimation module 112 may be operable to generate symbols (estimated symbols), from a signal received by the receiver 130, using the sequence estimation process which may incorporate the non-linear model for the received signal. The generated symbols may be estimates of transmitted symbols generated by the mapper 102 in the transmitter 120. The sequence estimation process may also comprise generating a reconstructed signal based on the estimated symbols and taps information associated with the pulse shaper 104 and/or the input filter 105. For example, the reconstructed signal may be generated based on convolution of the estimated symbols with the taps information associated with the pulse shaper 104 and/or the input filter 105. The generated reconstructed signal may then be used as a reference signal to generate an error signal for the equalizer 111. The equalizer 111 may be adapted based on the error signal.

Figure 2:
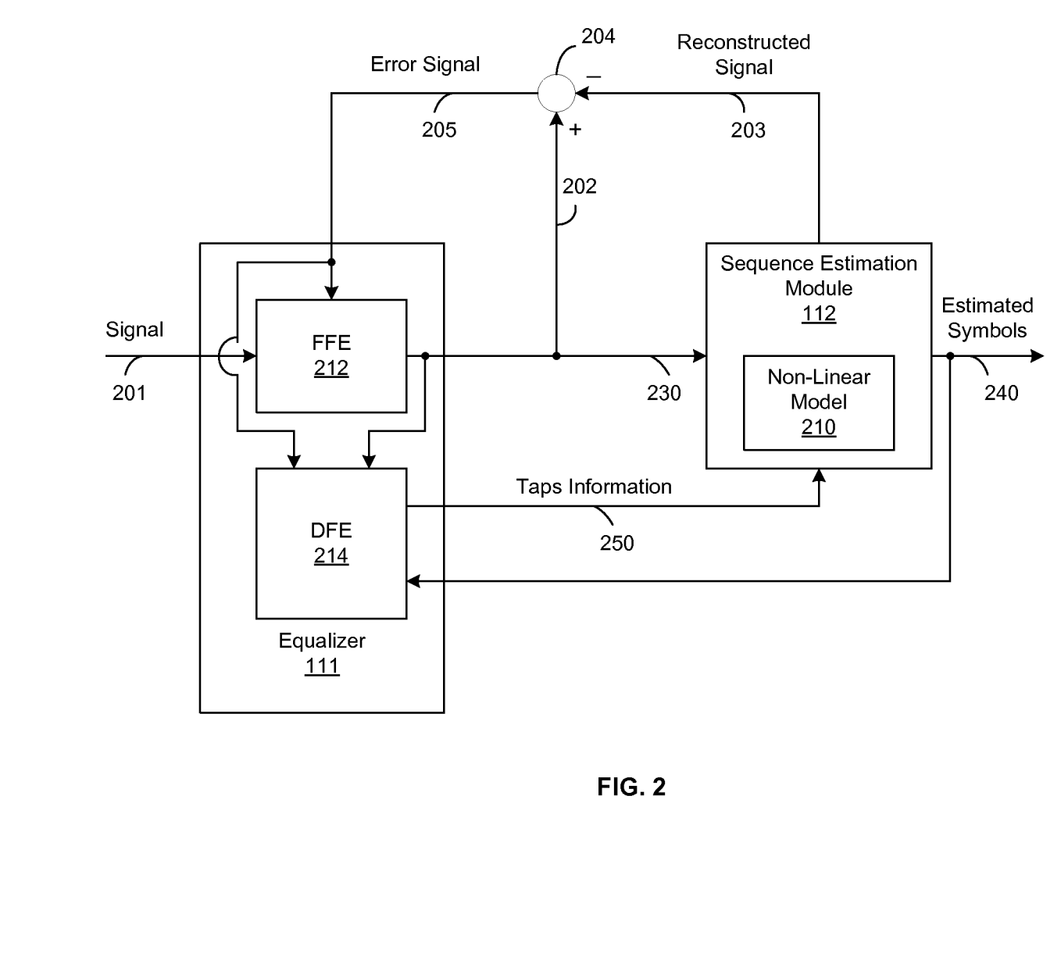
FIG. 2 is a block diagram illustrating an example coupling of an equalizer and a sequence estimation module in a receiver, in accordance with an embodiment of the disclosure.

FIG. 2 is a block diagram illustrating an example coupling of an equalizer and a sequence estimation module in a receiver, in accordance with an embodiment of the disclosure. Referring to FIG. 2, there is shown the equalizer 111 and the sequence estimation module 112. The equalizer 111 may comprise a FFE 212 and a decision feedback equalizer (DFE) 214. The sequence estimation module 112 may incorporate a non-linear model 210 in a sequence estimation process. The equalizer 111 and the sequence estimation module 112 may be as described with respect to FIG. 1, for example.

In the exemplary embodiment of the disclosure illustrated in FIG. 2, although the FFE 212, the DFE 214 and the sequence estimation module 112 are shown, the disclosure may not be so limited. Other modules (or circuits) such as, for example, a carrier recovery module, a phase adjust module and/or other similar modules may also be optionally included in FIG. 2 without departing from the spirit and scope of various embodiments of the disclosure. For example, the carrier recovery module and/or the phase adjust module may be included for various phase correction or recovery throughout the equalization process and/or the sequence estimation process.

The non-linear model 210 may comprise, for example, a saturated third order polynomial which may be expressed as $$y = \begin{cases} x \cdot (1 - r \cdot e^{j\varphi} \cdot |x|^2), & x < x_{sat} \\ y_{sat}, & x \geq x_{sat} \end{cases} \quad [1]$$

$$y_{sat} = x_{sat} \cdot (1 - r \cdot e^{j\varphi} \cdot |x_{sat}|^2)$$

where, $x_{sat}$ denotes the input saturation value, $y_{sat}$ denotes the output saturation value, x denotes an input of a non-linear device (or group of devices), y denotes an output of the non-linear device (or group of devices), and y may be set according to a desired distortion level (backoff). For example, the non-linear device may be a power amplifier in the Tx media matching module 107. In this regard, the x in equation [1] may denote an input power level of the power amplifier and the y may denote an output power level of the power amplifier. Increased accuracy resulting from the use of a higher-order polynomial for the non-linear model 210 may tradeoff with increased complexity of implementing a higher-order polynomial. As transmitter's non-linearity may be the dominant non-linearity of the communication system 100, modeling the transmitter's non-linearity may be sufficient. In instances where degradation in a receiver's performance is above a certain threshold due to other non-linearities in the system (e.g., non-linearity of the Rx media matching module 109), the non-linear model 210 may take into account such other non-linearities. Equation 1 represents just one example of a non-linearity model that may be used by the module 112 in one or more embodiments of the disclosure.

The FFE 212 may comprise suitable logic, circuitry, interfaces and/or code that may be operable to perform feed forward equalization functions for the receiver 130. The FFE 212 may comprise, for example, a FIR filter. The FFE 212 may be operable to process a signal 201 to reduce, for example, ISI caused by the channel 108 between the transmitter 120 and the receiver 130. In an example embodiment of the disclosure, the signal 201 may be an ISC signal such as a partial response signal received via the channel 108. In this regard, the output signal 202 of the FFE 212 may be a partial response signal where the ISI left in the output signal 202 may be primarily the result of the pulse shaper 104 (there may be some residual ISI from multipath, for example, due to use of a LMS approach in the FFE 212). In an example embodiment of the disclosure, the FFE 212 may be adapted based on an error signal 205 that may be generated in reference to a reconstructed signal 203 (e.g., a reconstructed partial response signal) generated by the sequence estimation module 112.

In an example embodiment, it may be possible to freeze (stop) FFE adaptation (i.e., "open" the loop by setting a loop gain to zero) in case of low-quality estimation of symbols or error event. By opening the FFE loop in such cases, the FFE response may be kept properly converged. Indications of low-quality symbol estimation may include any suitable performance indicator such as, for example, metrics calculated by the sequence estimation module 112, a slope over time of the metrics calculated by the sequence estimation module 112, a function based on the calculated metrics, SER, BER, equalizer error power (e.g., value of signal 201), etc. When the quality of the symbol estimation improves (as determined based on any of the suitable performance indicators), or when the error event is gone, the loop gain may resume normal values.

The DFE 214 may comprise suitable logic, circuitry, interfaces and/or code that may be operable to perform decision feedback equalization functions for the receiver 130. In an example embodiment of the disclosure, the DFE 214 may be operable to primarily provide, to the sequence estimation module 112, taps information 250 associated with the pulse shaper 104 and/or the input filter 105 in the communication system 100. The taps information associated with the pulse shaper 104 and/or the input filter 105 may be presented, for example, in the form of L (where LTx<=L<=(LTx+LRx−1)) tap coefficients corresponding to the total partial response h, according to the LTx tap coefficients of the pulse shaper 104 and the LRx tap coefficients of the input filter 105. In this regard, DFE tap coefficients of the DEF 214 may be initialized according to the known taps information (e.g., the L tap coefficients) associated with the pulse shaper 104 and/or the input filter 105. In perfect channel conditions, the DFE tap coefficients may be set to the L tap coefficients sampled at the symbol rate. In non-perfect channel conditions, the DFE tap coefficients may be compensated, for example, for a residual channel response and/or multipath. The taps information 250 provided by the DFE 214 may be utilized by the sequence estimation module 112 in the sequence estimation process. In some instances, the tap coefficients of the DFE 214 may be optimized to achieve other goals (e.g., to compensate for channel distortion such as multipath) in addition to the performance of the sequence estimation module 112. In this regard, the DFE 214 may be operable to adapt or update the DFE tap coefficients based on, for example, the generated symbols (estimated symbols) 240, the error signal 205, measured performance indicators (e.g., SNR, SER, BER, etc.), and/or any other suitable parameter that may reflect changes in a condition of the channel 108, the transmitter 120, and/or the receiver 130.

In an example operation, the FFE 212 may be operable to process or equalize a received signal 201 to reduce, for example, ISI caused by the channel 108. The FFE 212 may be operable to receive an error signal 205. The error signal 205 is fed back to the FFE 212 to drive the adaptive FFE 212. The adaptation of the FFE 212 may be based on, for example, a LMS process for minimizing a mean square error associated with the error signal 205 and samples of the signal 201 stored in the FFE 212. The reference for generating the error signal 205 may be, for example, a reconstructed signal 203 coming from the sequence estimation module 112. In an example embodiment of the disclosure, the signal 201 may be an ISC signal such as a partial response signal. In this regard, the reconstructed signal 203 may be a reconstructed partial response signal. The error signal 205 is the difference, calculated by a combiner 204, between an output signal 202 of the FFE 212 and the reconstructed signal 203. An example implementation of the FFE 212 is described below with reference to FIG. 4. The DFE 214 may be operable to provide taps information 250 associated with one or both of the pulse shaper 104 and the input filter 105 in the communication system 100. An equalized signal 230 may be inputted to the sequence estimation module 112. The sequence estimation module 112 may be operable to generate symbols (estimated symbols) 240 corresponding to the received signal 201, using the sequence estimation process. The generated symbols 240 may be hard and/or soft estimates of transmitted symbols generated by the mapper 102 in the transmitter 120. The generating of the estimated symbols 240 may use the tap information 250 and may incorporate the non-linear model 210. The sequence estimation process may also comprise generating the reconstructed signal 203 based on the estimated symbols 240 and the tap information 250. For example, the reconstructed signal 203 may be generated based on convolution of the estimated symbols 240 with the taps information 250. An example implementation of the sequence estimation module 112 is described below with reference to FIG. 3. Generation of the reconstructed signal 203 may incorporate the non-linear model 210 of the signal 201 and is also described below with reference to FIG. 3.

Figure 3:
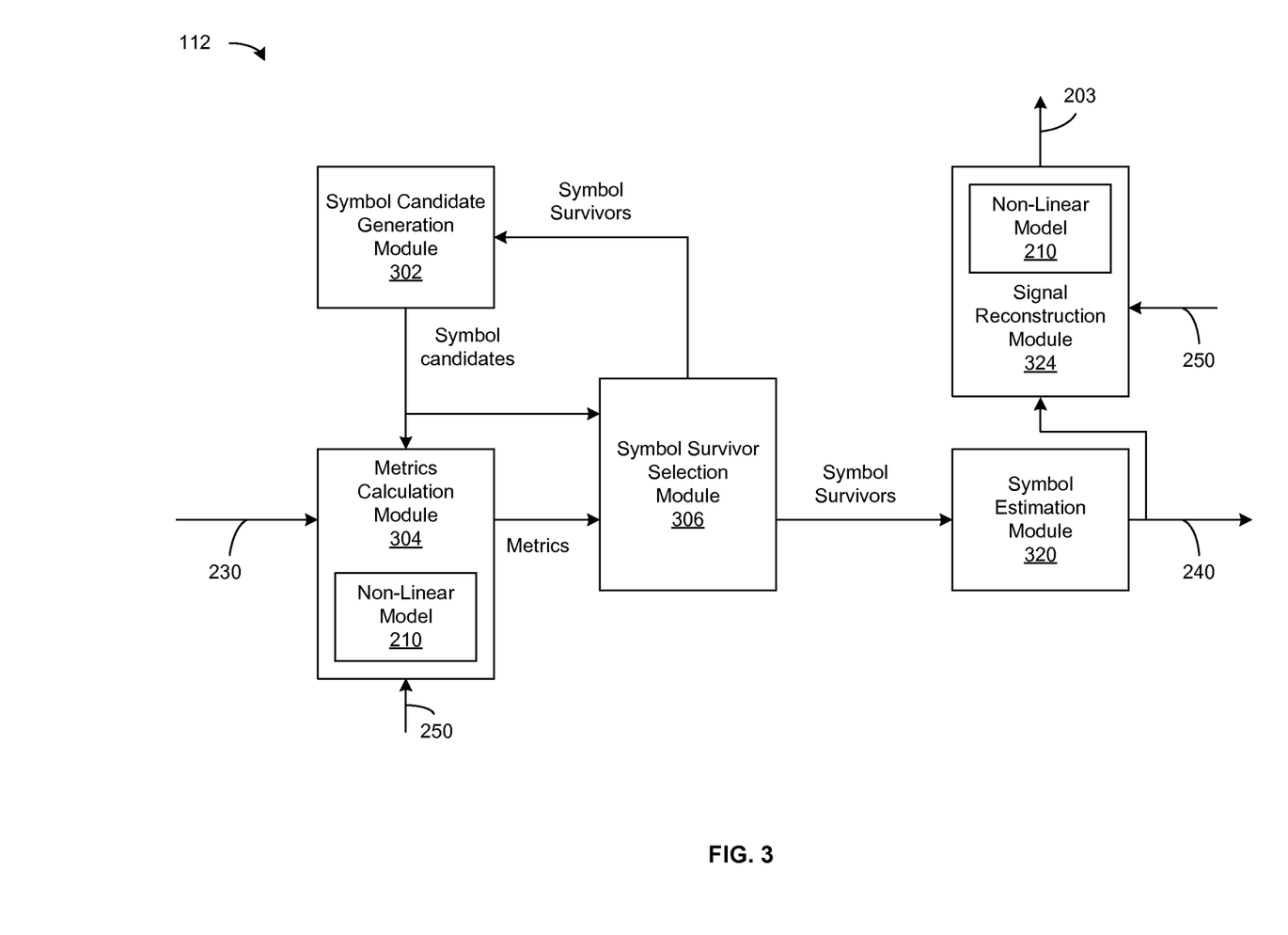
FIG. 3 is a block diagram illustrating an example sequence estimation module, in accordance with an embodiment of the disclosure.

FIG. 3 is a block diagram illustrating an example sequence estimation module, in accordance with an embodiment of the disclosure. Referring to FIG. 3, there is shown the sequence estimation module 112. The sequence estimation module 112 may comprise, for example, a symbol candidate generation module 302, a metrics calculation module 304, a symbol survivor selection module 306, a symbol estimation module 320 and a signal reconstruction module 324. The sequence estimation process described with respect to FIG. 3 is an example only. Many variations of the sequence estimation process may also be possible. The sequence estimation module 112 may be as described with respect to FIGS. 1 and 2, for example.

The metrics calculation module 304 may comprise suitable logic, circuitry, interfaces and/or code that may be operable to generate metrics needed for symbol survivor selections and symbol (including corresponding phase) estimations. Metrics calculations may be executed based on the signal 230 received by the metrics calculation module 304 and symbol candidates generated by the symbol generation module 302. Each symbol candidate may be a vector comprising, for example, Q candidate symbols (Q is a positive integer). Taps information 250 associated with one or both of the pulse shaper 104 and the input filter 105 may also be utilized for the metrics calculation. In an example embodiment of the disclosure, the signal 230 may be an equalized ISC signal such as a partial response signal received from the FFE 212. The taps information 250 associated with one or both of the pulse shaper 104 and the input filter 105 may be used to generate reconstructed partial response signal candidates from the symbol candidates, for example, via convolution. The taps information 250 associated with the pulse shaper 104 and/or the input filter 105 may be presented, for example, in the form of L (where $LTx<=L<=(LTx+LRx-1)$) tap coefficients corresponding to the total partial response h, according to the LTx tap coefficients of the pulse shaper 104 and the LRx tap coefficients of the input filter 105. The taps information 250 may be provided, for example, by the DFE 214. Furthermore, the non-linear model 210 may be incorporated in the process of generating the reconstructed partial response signal candidates. For example, the non-linear model 210 may be applied to the convolved symbol candidates to generate the reconstructed partial response signal candidates. The metric value for each of the symbol candidates may then be generated based on a cost function (e.g., a squared error function) between the signal 230 and the reconstructed partial response signal candidates. The candidates which have the best metrics level may be selected by the symbol survivor selection module 306 for the next iteration of the sequence estimation process.

The symbol survivor selection module 306 may comprise suitable logic, circuitry, interfaces and/or code that may be operable to perform metrics sorting and selection of a determined number of symbol survivors based on the metrics associated with the symbol candidates. In this regard, for example, one or more candidates which have the lowest metrics level may be selected, from among the symbol candidates, as symbol survivors. Each symbol survivor may also be a vector comprising, for example, Q candidate symbols (Q is a positive integer). Each element of each symbol survivor may comprise a soft-decision estimate and/or a hard-decision estimate of a symbol of the signal 230. Besides a newly-detected symbol at a head of the vector, there are (Q-1) symbols in the vector. Some of the (Q-1) symbols could be different than corresponding symbols in a previously-selected symbol survivor (i.e. the sequence estimation may diverge to a different vector). The reliability of the newly-detected symbol may be very low because it may be derived only from the newest signal sample and a first tap of the L taps associated with the pulse shaper 104 and/or the input filter 105, which may have a coefficient that is small in magnitude. The reliability of old symbols toward a tail of the vector may improve along the survived vectors because old symbols are represented by many signal samples (up to effective number of the taps of the total partial response) and thus take advantage of more information. In this regard, the tails (old symbols) of the symbol survivors may converge to the same solution while the head (young symbols) parts of the symbol survivors may be different.

The symbol candidate generation module 302 may comprise suitable logic, circuitry, interfaces and/or code that may be operable to generate symbol candidates from symbol survivors generated from a previous iteration of the sequence estimation process. For example, for M-OAM (M is a positive integer), there are M symbols in the M-QAM symbol constellation (e.g., the modulation symbol constellation 150) over an I-Q plane. In this regard, generation of the symbol candidates may comprise, for example, duplicating (e.g., (M-1) times) each of the symbol survivors (vectors) generated during the previous iteration of the sequence estimation process, shifting each of the resulting M vectors by one symbol position toward the tail of the vector, and then filling each of the M vacant symbol positions (at the head of the vector) with a symbol from among the M possible symbols in the M-QAM symbol constellation (e.g., the modulation symbol constellation 150).

The symbol estimation module 320 may comprise suitable logic, circuitry, interfaces and/or code that may be operable to generate symbols (estimated symbols) 240 based on the symbol survivors received from the symbol survivor selection module 306. In an example embodiment of the disclosure, the symbol estimation module 320 may be operable to generate the symbols 240 based on a best symbol survivor with the lowest metric value. The symbol estimation module 320 may comprise one or more buffers to store one or more symbol survivors. The generated symbols 240 may also be outputted from the symbol estimation module 320 to the signal reconstruction module 324 for generating the reconstructed signal 203.

The signal reconstruction module 324 may comprise suitable logic, circuitry, interfaces and/or code that may be operable to generate the reconstructed signal 203. In an example embodiment of the disclosure, the signal 230 may be an equalized ISC signal such as a partial response signal received from the FFE 212. The taps information 250 associated with the pulse shaper 104 and/or the input filter 105 (e.g., the L tap coefficients) may be used to generate the reconstructed signal (partial response signal) 203 from the estimated symbols 240, for example, via convolution. In this regard, for example, the non-linear model 210 may be incorporated in the process of generating the reconstructed signal (partial response signal) 203. For example, the non-linear model 210 may be applied to the convolved symbols to generate the reconstructed signal (partial response signal) 203.

In an example operation, the sequence estimation module 112 may be operable to generate estimated symbols 240 via the metrics calculation module 304, the symbol survivor selection module 306, the symbol candidate generation module 302 and the symbol estimation module 320. The generating of the estimated symbols 240 may include the use the tap information 250 in the metrics calculation module 304. The signal reconstruction module 324 may be operable to generate the reconstructed signal 203 based on the generated estimated symbols 240 and the taps information 250. For example, the reconstructed signal 203 may be generated based on convolution of the generated symbols (estimated symbols) 240 with the taps information 250. The non-linear model 210 may be incorporated in the process of generating the reconstructed signal 203 in the signal reconstruction module 324. In this regard, for example, the non-linear model 210 may be applied to the convolved symbols to generate the reconstructed signal 203. An error signal such as the error signal 205 may be generated or derived in reference to the reconstructed signal 203 (see FIG. 2). The error signal 205 may be utilized to drive the adaptive FFE 212 during an equalization process.

Figure 4:
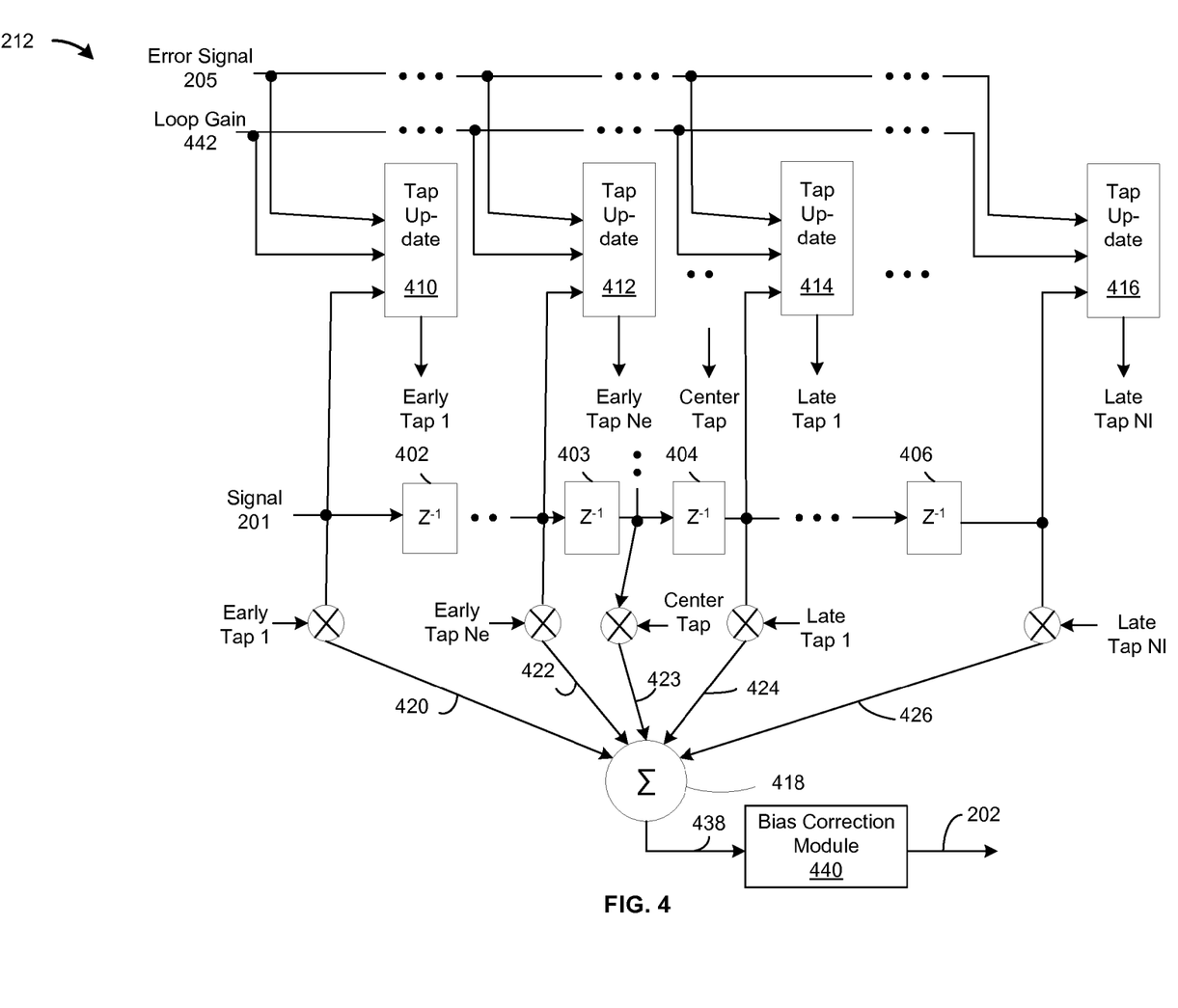
FIG. 4 is a block diagram illustrating an example feed forward equalizer, in accordance with an embodiment of the disclosure.

FIG. 4 is a block diagram illustrating an example feed forward equalizer (FFE), in accordance with an embodiment of the disclosure. Referring to FIG. 4, there is shown the FFE 212. The FFE 212 may comprise, for example, a plurality of delay elements (e.g., Z transform delay elements) of which delay elements 402, 403, 404, 406 are illustrated, a plurality of tap update units of which tap update units 410, 412, 414, 416 are illustrated, and a bias correction module 440. The FFE 212 may be as described with respect to FIGS. 1 and 2, for example.

In an example operation, the FFE 212 may be operable to receive a signal such as the signal 201. The signal 201 may be at a sampling rate of twice the symbol rate so as to enable compensation of slow timing errors that may be generated by the timing recovery module 110. The FFE 212 may comprise a plurality of taps (FFE taps). The plurality of taps of the FFE 212 may comprise a center tap, one or more early taps (e.g., early taps 1-Ne) and one or more late taps (e.g., late taps 1-NI). In an example embodiment of the disclosure, an initial value of a coefficient of the center tap may be set to one and an initial value of a coefficient of each of the early taps 1-Ne and each of the late taps 1-NI may be set to zero. The tap coefficients (coefficients of the early taps 1-Ne, the center tap, and/or the late taps 1-NI) of the FFE 212 may be generated and/or adapted (updated) by the corresponding tap update units 410, 412, 414, 416. The tap coefficients of the FFE 212 may be adapted or updated to compensate, for example, for channel ISI caused by the channel 108. The updating or adaptation of the tap coefficient values of the FFE 212 may be based on the reconstructed signal 203 generated by the signal reconstruction module 324 in the sequence estimation module 112. In this regard, the updating or adaptation of the tap coefficient values of the FFE 212 may be based on various inputs such as, for example, the error signal 205 and/or a loop gain 442. The FFE 212 may be operable to receive the error signal 205 that may be generated in reference to the reconstructed signal 203. The updating or adaptation may also be referred to as convergence, for example, if the tap coefficient values are approaching optimal values. Each of the tap update units 410, 412, 414, 416 may include an accumulator or integrator that may utilize an adaption function such as a LMS function. In this regard, the FFE 212 may be operable to adapt, via the tap update units 410, 412, 414, 416, the tap coefficients (coefficients of the early taps 1-Ne, the center tap, and/or the late taps 1-NI) based on the LMS process for minimizing a mean square error. In some embodiments, the tap update units 410, 412, 414, 416 may be combined into a single unit instead of being configured as discrete units as shown in FIG. 4.

In an example embodiment of the disclosure, the error signal 205 may be multiplied by the loop gain 442 for the corresponding tap update units 410, 412, 414, 416. The loop gain 442 may be utilized by the FFE 212 to adjust or improve a convergence time of the adaptation of the tap coefficients of the FFE 212. A properly selected or determined loop gain 442 may adapt the tap coefficients of the FFE 212 to converge quickly without producing a noisy or distorted output signal 202. For example, if a value of the loop gain 442 is too high, the convergence may happen quickly, but the output signal 202 may have undesirable noise or distortions. If the value of the loop gain 442 is too low, the output signal 202 may not include undesirable noise or distortions, but the convergence may happen slowly. In this regard, the FFE 212 may be operable to determine to adjust the convergence time based on a noise level of the output signal 202. The loop gain 442 may be adjusted based on a predefined symbol counter level and/or other adaptive method or function. For example, a symbol counter (not shown) in the FFE 212 may count the number of symbols that have entered the FFE 212 since a reference point. The reference point may be, for example, a termination point of a symbol acquisition process (e.g., utilizing preamble symbols) performed by the sequence estimation module 112. The FFE 212 may be operable to adjust the loop gain 442, for example, by scaling a value of the loop gain 442 by a factor of two until the value of the loop gain 442 reaches a determined value. For example, an initial value of the loop gain 442 may be reduced by a factor of two until the value reaches a minimum tracking value.

In an example embodiment of the disclosure, in instances when at least one of measured performance indicators is below a determined threshold, the loop gain 442 may be set to zero so as to stop (freeze) the adaption of the tap coefficients (coefficients of the early taps 1-Ne, the center tap, and/or the late taps 1-NI) of the FFE 212. In this regard, the measured performance indicators may be based on metrics calculated by the sequence estimation module 112, for example.

The FFE 212 may utilize the tap coefficients (coefficients of the early taps 1-Ne, the center tap, and/or the late taps 1-NI) and the delay elements 402, 403, 404, 406 to perform, for example, FIR filtering. A signal 438 may be generated by a summing element 418. The summing element 418 may receive as inputs a plurality of signals such as, for example, signals 420, 422, 423, 424, 426. In this regard, each of the plurality of signals 420, 422, 423, 424, 426 may be the product (multiplication) of a signal (e.g., the signal 201 or a delayed version of the signal 201) and a tap coefficient of the FFE 212. For example, the signal 420 may be the product of the signal 201 and the coefficient of early tap 1. The signal 423 may be the product of the delayed signal after the delay element 403 and the coefficient of the center tap. The signal 426 may be the product of the delayed signal after the delay element 406 and the coefficient of the late tap NI. In an example embodiment of the disclosure, the signal 438 may be inputted to the bias correction module 440 for a power gain compensation. The power gain compensation may enable compensating for a reduced signal power due to, for example, the LMS process. The LMS process is a biased estimation process. In instance when a noise levels are high and/or desired signal levels are low, the LMS process may tend to reduce estimated signal power so as to reduce overall noise level. In such instances, the bias correction module 440 may be operable to provide the power gain compensation for increasing the power level of the signal 438 back to a nominal level. In this regard, the output signal 202 of the FFE 212 may comprise the power gain compensation for overcoming the reduced signal power due to the LMS process.

Figure 5:
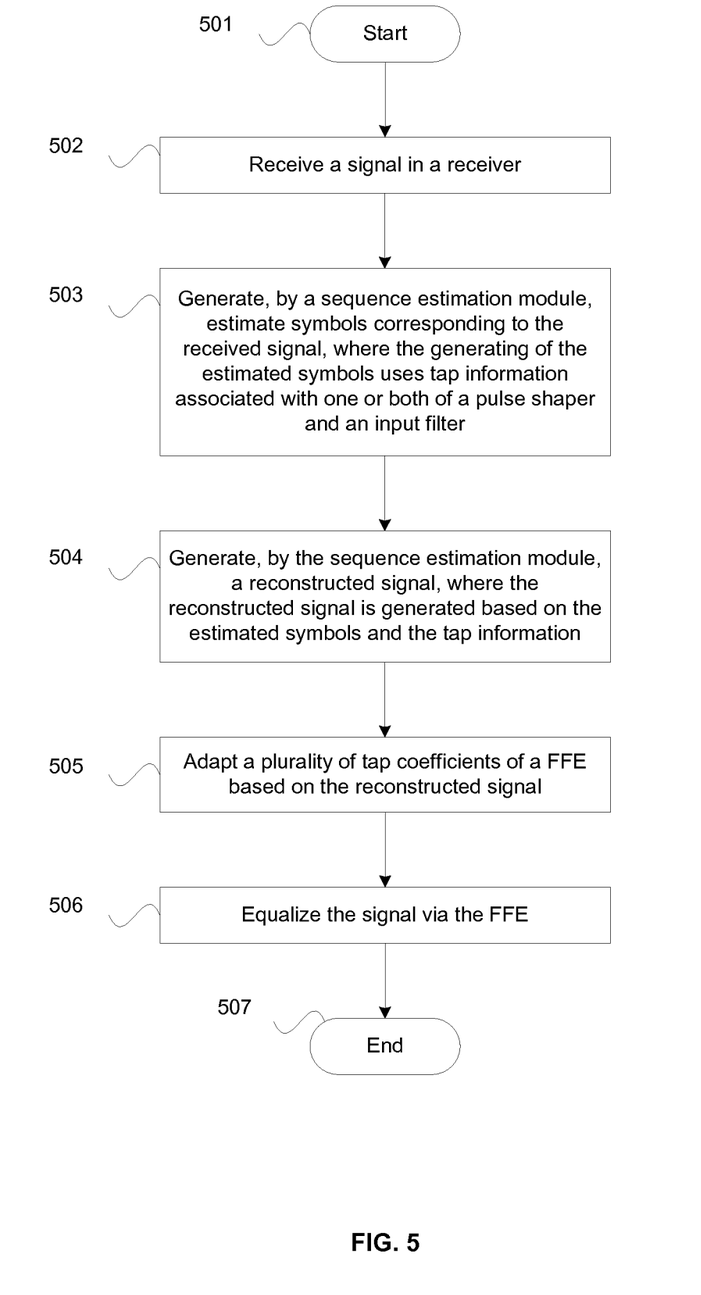
FIG. 5 is a flow chart illustrating example steps for feed forward equalization for highly-spectrally-efficient communications, in accordance with an embodiment of the disclosure.

FIG. 5 is a flow chart illustrating example steps for feed forward equalization for highly-spectrally-efficient communications, in accordance with an embodiment of the disclosure. Referring to FIG. 5, the example steps start at step 501. In step 502, the FFE 212 in the receiver 130 may be operable to receive a signal such as the signal 201. In step 503, the sequence estimation module 112 in the receiver 130 may be operable to generate estimate symbols 240 corresponding to the received signal 201. The generating of the estimated symbols 240 may use taps information 250 associated with one or both of the pulse shaper 104 via which the signal 201 was transmitted and the input filter 105 of the receiver 130. In step 504, a reconstructed signal such as the reconstructed signal 203 may be generated, by the sequence estimation module 112, and the reconstructed signal 203 may be generated based on the estimated symbols 240 and the taps information 250. For example, the reconstructed signal 203 may be generated based on convolution of the estimated symbols 240 with the taps information 250. In step 505, the FFE 212 may be operable to adapt a plurality of tap coefficients of the FFE 212 based on the reconstructed signal 203. For example, the adaptation of the plurality of tap coefficients of the FFE 212 may be based on an error signal such as the error signal 205 that may be generated in reference to the reconstructed signal 203. In step 506, the signal 201 may be equalized via the FFE 212. The example steps may proceed to the end step 507.

Figure 6:
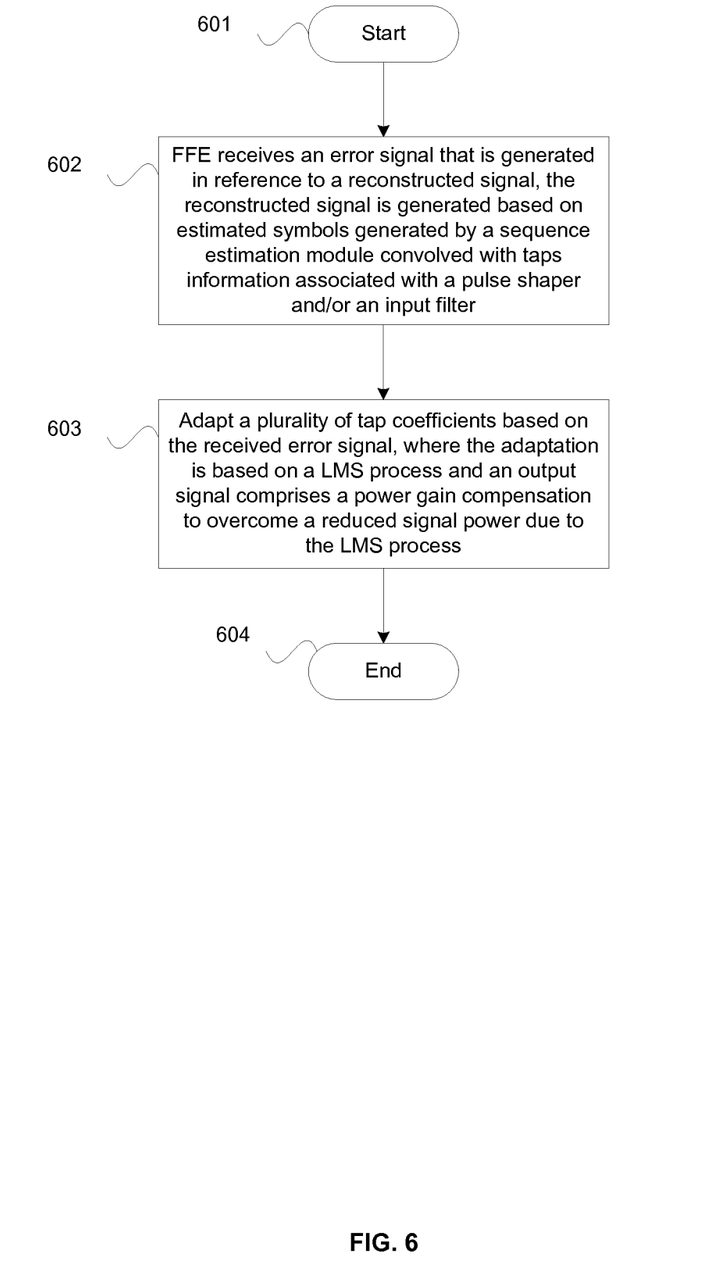
FIG. 6 is a flow chart illustrating example steps for feed forward equalization for highly-spectrally-efficient communications, in accordance with an embodiment of the disclosure.

FIG. 6 is a flow chart illustrating example steps for feed forward equalization for highly-spectrally-efficient communications, in accordance with an embodiment of the disclosure. Referring to FIG. 6, the example steps start at step 601. In step 602, the FFE 212 within the receiver 130 may be operable to receive an error signal such as the error signal 205 that may be generated in reference to a reconstructed signal such as the reconstructed signal 203 generated by the sequence estimation module 112 in the receiver 130. The reconstructed signal 203 may be generated based on estimated symbols 240 generated by the sequence estimation module 112 convolved with taps information 250 associated with a pulse shaper 104 and/or an input filter 105, for example. In step 603, the FFE 212 may be operable to adapt a plurality of tap coefficients of the FFE 212 based on the received error signal 205. In this regard, the adaptation of the tap coefficients of the FFE 212 may be based on a LMS process for minimizing a mean square error, and an output signal 202 of the FFE 212 may comprise a power gain compensation to overcome a reduced signal power due to the LMS process. The example steps may proceed to the end step 604.

In various embodiments of the disclosure, a FFE 212 in a receiver 130 may be operable to receive a signal 201. A sequence estimation module 112 in the receiver 130 may be operable to generate estimate symbols 240 corresponding to the received signal 201. The generating of the estimated symbols 240 may use taps information 250 associated with one or both of a pulse shaper 104 via which the signal 201 was transmitted and an input filter 105 of the receiver 130. A reconstructed signal such as the reconstructed signal 203 may be generated, by the sequence estimation module 112, and the reconstructed signal 203 may be generated based on the estimated symbols 240 and the taps information 250. The FFE 212 may be operable to adapt a plurality of tap coefficients of the FFE 212 based on the reconstructed signal 203. The signal 201 may be equalized via the FFE 212. In this regard, the reconstructed signal 203 may be generated, for example, based on convolution of the estimated symbols 240 with the taps information 250 associated with the pulse shaper 104 and/or the input filter 105. The generation of the reconstructed signal 203 may incorporate a non-linear model such as the non-linear model 210, for example. The FFE 212 may comprise, for example, a FIR filter. A plurality of taps of the FFE 212 may comprise a center tap, a plurality of early taps (e.g., early taps 1-Ne) and a plurality of late taps (e.g., late taps 1-NI). An initial value of a coefficient of the center tap may be set to one and an initial value of a coefficient of each of the early taps 1-Ne and each of the late taps 1-NI may be set to zero, for example.

The FFE 212 may be operable to adapt the plurality of tap coefficients of the FFE based on a LMS process for minimizing a mean square error. An output signal 202 of the FFE 212 may comprise a power gain compensation, for example. The FFE 212 may be operable to utilize a determined loop gain 442 to adjust a convergence time of the adaptation of the plurality of tap coefficients of the FFE 212. The loop gain 442 may be adjusted by the FFE 212 based on a predefined symbol counter level and/or other adaptive method. The loop gain 442 may be adjusted, for example, by scaling a value of the loop gain 442 by a factor of two until the value reaches a determined value. The FFE 212 may be operable to determine to adjust the convergence time based on a noise level of an output signal 202 of the FFE 212.

In instances when at least one of measured performance indicators is below a determined threshold, the loop gain 442 may be set to zero to stop (freeze) the adaption of the tap coefficients (coefficients of the early taps 1-Ne, the center tap, and/or the late taps 1-NI) of the FFE 212. In this regard, the measured performance indicators may be based on metrics calculated by the sequence estimation module 112, for example.

In an example embodiment of the disclosure, the FFE 212 may be operable to receive an error signal 205 that may be generated in reference to the reconstructed signal 203 generated by a signal reconstruction module 324 in the sequence estimation module 112. The reconstructed signal 203 may be generated based on, for example, the estimated symbols 240 convolved with the taps information 250 associated with the pulse shaper 104 and/or the input filter 105. The FFE 212 may be operable to adapt the plurality of tap coefficients of the FFE 212 based on the received error signal 205. In this regard, the adaptation may be based on the LMS process for minimizing a mean square error associated with the error signal 205 and samples of the signal 201 stored in the FFE 212, and the output signal 202 of the FFE 212 may comprise the power gain compensation to overcome a reduced signal power due to the LMS process.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for feed forward equalization for highly-spectrally-efficient communications.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
  receiving a signal in a receiver;
  generating, by a sequence estimation module of the receiver, estimated symbols corresponding to the received signal, wherein the generating of the estimated symbols uses tap information associated with one or both of a pulse shaper via which the signal was transmitted and an input filter of the receiver;
  generating, by the sequence estimation module, a reconstructed signal, wherein the reconstructed signal is generated based on the estimated symbols and the tap information;
  adapting a plurality of tap coefficients of a feed forward equalizer (FFE) of the receiver based on the reconstructed signal;
  equalizing the received signal via the FFE;
  utilizing a determined loop gain to adjust a convergence time of the adaptation of the plurality of tap coefficients of the FFE; and
  determining to adjust the convergence time based on a noise level of an output signal of the FFE.

2. A method, comprising:
  receiving a signal in a receiver;
  generating, by a sequence estimation module of the receiver, estimated symbols corresponding to the received signal, wherein the generating of the estimated symbols uses tap information associated with one or both of a pulse shaper via which the signal was transmitted and an input filter of the receiver;
  generating, by the sequence estimation module, a reconstructed signal, wherein the reconstructed signal is generated based on the estimated symbols and the tap information;
  adapting a plurality of tap coefficients of a feed forward equalizer (FFE) of the receiver based on the reconstructed signal;
  equalizing the received signal via the FFE;
  utilizing a determined loop gain to adjust a convergence time of the adaptation of the plurality of tap coefficients of the FFE; and
  setting the loop gain to zero to stop the adaptation of the plurality of tap coefficients of the FFE when at least one of measured performance indicators is below a determined threshold, wherein the measured performance indicators are based on metrics calculated by the sequence estimation module.

3. The method according to claim 2, wherein the reconstructed signal is generated based on convolution of the estimated symbols with the tap information.

4. The method according to claim 2, wherein the generation of the reconstructed signal incorporates a non-linear model.

5. The method according to claim 2, wherein a plurality of taps of the FFE comprise a center tap, one or more early taps and one or more late taps.

6. The method according to claim 5, wherein an initial value of a coefficient of the center tap is set to one and an initial value of a coefficient of each of the early taps and each of the late taps is set to zero.

7. The method according to claim 2, comprising adapting the plurality of tap coefficients of the FFE based on a least-mean-square (LMS) process for minimizing a mean square error.

8. The method according to claim 2, wherein an output signal of the FFE comprises a power gain compensation.

9. The method according to claim 2, comprising utilizing a determined loop gain to adjust a convergence time of the adaptation of the plurality of tap coefficients of the FFE.

10. The method according to claim 9, comprising adjusting the loop gain based on a predefined symbol counter level and/or other adaptive method.

11. The method of claim 2, comprising:
generating an error signal in reference to the reconstructed signal generated by the sequence estimation module in the receiver, wherein:
the reconstructed signal is generated based on the estimated symbols convolved with the tap information; and
the tap information is associated with a pulse shaper in a transmitter; and
adapting a plurality of tap coefficients of a feed forward equalizer (FFE) of the receiver based on the error signal, wherein:
the adaptation is based on a least-mean-square (LMS) process for minimizing a mean square error; and
an output signal of the FFE comprises a power gain compensation to overcome a reduced signal power due to the LMS process.

12. A system, comprising:
a receiver, the receiver being operable to:
receive a signal in the receiver;
generate, by a sequence estimation module of the receiver, estimated symbols corresponding to the received signal, wherein the generating of the estimated symbols uses tap information associated with one or both of a pulse shaper via which the signal was transmitted and an input filter of the receiver;
generate, by the sequence estimation module, a reconstructed signal, wherein the reconstructed signal is generated based on the estimated symbols and the tap information;
adapt a plurality of tap coefficients of a feed forward equalizer (FFE) of the receiver based on the reconstructed signal; and
equalize the received signal via the FFE, wherein the FFE is operable to:
utilize a determined loop gain to adjust a convergence time of the adaptation of the plurality of tap coefficients of the FFE; and
set the loop gain to zero to stop the adaptation of the plurality of tap coefficients of the FFE when at least one of measured performance indicators is below a determined threshold, and the measured performance indicators are based on metrics calculated by the sequence estimation module.

* * * * *